(12) United States Patent
Reichert et al.

(10) Patent No.: US 6,381,111 B1
(45) Date of Patent: *Apr. 30, 2002

(54) SAFETY DEVICE FOR A NUMBER OF ELECTRICAL LOADS

(75) Inventors: Walter Reichert, Schwieberdingen; Juergen Lutz, Ditzingen, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,518

(22) Filed: Aug. 25, 1999

(30) Foreign Application Priority Data

Aug. 27, 1998 (DE) .......................... 198 38 958

(51) Int. Cl.[7] ................................. H02H 5/10
(52) U.S. Cl. ................. 361/31; 361/104; 361/93.1; 361/115; 361/63; 361/103
(58) Field of Search ............... 361/93.1, 93.2, 361/103, 104, 63, 115, 31

(56) References Cited

U.S. PATENT DOCUMENTS

| 4,351,014 A | * | 9/1982 | Schofield, Jr. ............... 361/100 |
| 4,404,613 A | * | 9/1983 | Channing et al. ........... 361/104 |
| 4,675,771 A | * | 6/1987 | Huber ......................... 361/41 |
| 5,170,310 A | * | 12/1992 | Studtmann et al. ........... 361/94 |
| 5,662,388 A | | 9/1997 | Wuerth et al. |
| 5,823,640 A | | 10/1998 | Eichhorn et al. |

FOREIGN PATENT DOCUMENTS

| DE | 29 35 196 | 3/1981 |
| JP | 4-76131 | 7/1992 |

* cited by examiner

*Primary Examiner*—Josie Ballato
*Assistant Examiner*—Robert L DeBeradinis
(74) *Attorney, Agent, or Firm*—Kenyon & Kenyon

(57) ABSTRACT

A safety device for a number of electrical loads that are connected to a supply line between a high-side path and a low-side path. The loads are activatable individually by way of drivers provided in the low-side path. A fuse is provided in the high-side path (2a) and causes, in the event of a defect in at least one driver, a permanent interruption in the high-side path.

6 Claims, 1 Drawing Sheet

SAFETY DEVICE FOR A NUMBER OF ELECTRICAL LOADS

FIELD OF THE INVENTION

The present invention relates to a safety device for a number of electrical loads, and a method for shutting off a number of electrical loads.

BACKGROUND INFORMATION

In control units for antilock braking systems, slip control regulating systems, and vehicle dynamics control systems, solenoid valves are used to adjust the respective manipulated variables. For safety reasons, it must be possible to shut off the solenoid valves via two shutoff paths. In a first shutoff path, which makes possible individual activation or shutoff of individual solenoid valves of a quantity of solenoid valves during normal operation, low-side drivers serve as the activation elements. What is used as the second shutoff path for the solenoid valves is usually a semiconductor switch element or a magnetic relay, to be arranged in the high-side path (supply line). This ensures that even in the event of an irreversible defect in a low-side driver (activation system), the solenoid valves (loads) can be shut off in order to avoid a safety-critical condition.

It is regarded as disadvantageous in circuits of this kind that expensive semiconductor switches requiring a complex protective structure, or bulky mechanical relays, must be used in order to guarantee safety.

German Published Patent Application No. 29 35 196 discusses a safety device for electrical loads in motor vehicles, having a current flow sensing member and a control device for a current flow interrupter, in which the current flow through the load is sensed by way of an RC element, and the control device comprises a threshold value switch, to which the output signal of the RC element is delivered and whose output signal controls a current interrupter switch.

SUMMARY OF THE INVENTION

An object of the present invention is the provision of a circuit with which a second shutoff path for a number of electrical loads (in particular solenoids) that is necessary for safety reasons can be implemented in simple and economical fashion.

According to the present invention, it is now possible to eliminate the expensive semiconductor switches together with their protective structure, or bulky mechanical relays, that were conventionally used. Because the defect in a driver is irreversible, it is sufficient to bring about permanent interruption of the supply line. Any additional switching function in the supply line by way of an electronic or electromagnetic relay can be dispensed with without incurring disadvantages.

It is possible, in particular by specific activation of, for example, all the loads by way of the corresponding drivers (which represents an abnormal operating state), to generate in the supply line a current strength or intensity that causes the fuse to respond. It is also conceivable to activate only some of the other drivers in a situation of this kind. All that is important is to make available sufficient current strength for the fuse to respond. Activation of each of the drivers can be brought about by way of a suitable control device that is configured, for example, with a monitoring logic system that detects a defect in a driver (a monitoring logic system of this kind is capable of detecting a defect, but is not in a position to remedy a defect). It is also possible to configure each drivers with a monitoring logic system of this kind.

According to a preferred embodiment of the safety device according to the present invention, provision is made for the loads to be located between a high-side path and a low-side path of the supply line, the drivers being provided on the low-side path and the fuse on the high-side path. This makes available a particularly simple and reliable safety device which exploits the fact that, in contrast to conventional safety apparatuses, a relatively high current can be generated in the high-side path by activating a predetermined number of loads. By way of a current of this kind, the correspondingly dimensioned fuse can be caused to respond in suitable fashion. A defect in the activation system of a load can be detected, for example, by way of a monitoring logic system of the drivers or activation ICs provided in the low-side path.

Advantageously, the fuse used in the safety device is a blow-out fuse. Blow-out fuses of this kind are available at low cost in a plurality of sizes and power ranges. The fuse can also be implemented, for example, by selection of a suitable conductor path geometry.

Advantageously, the loads are, in particular, solenoid valves usable in antilock braking, slip control, or vehicle dynamics control systems. Solenoid valves of this kind can be easily and reliably operated using safety devices according to the present invention.

BRIEF DESCRIPTION OF THE DRAWINGS

The drawing shows a schematic circuit diagram of a preferred embodiment of the safety device according to the present invention.

DETAILED DESCRIPTION

Figure 1:
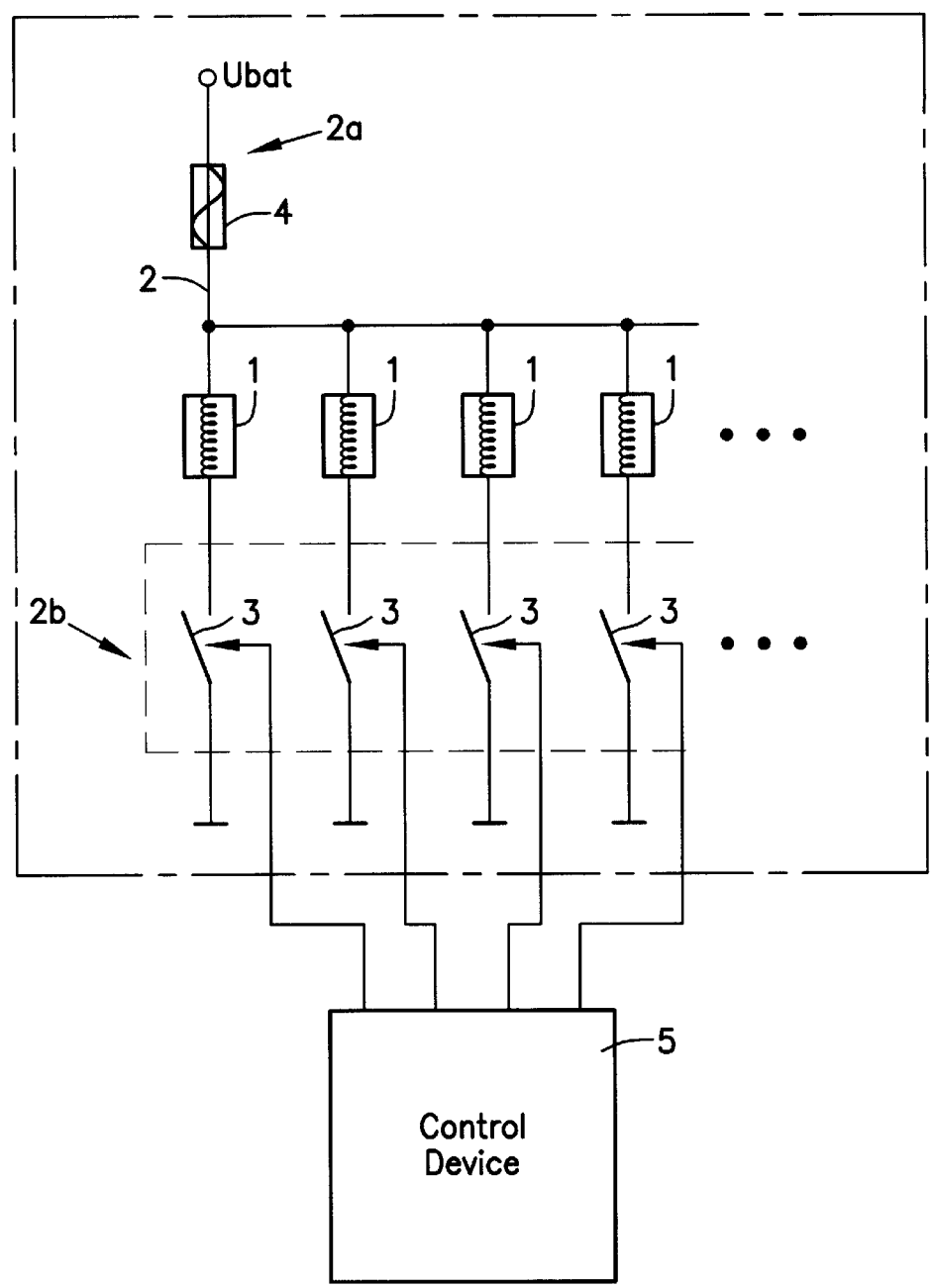

The safety device depicted in the drawing, for a number of solenoid valves 1 arranged in parallel, has a supply line 2 connected to a supply voltage Ubat and having a high-side path 2a and a low-side path 2b. An individually activatable driver 3 is provided for each of solenoids 1. A blow-out fuse 4 is configured in high-side path 2a.

During normal operation, solenoid valves 1 are activated individually by way of drivers 3 by a control device 5, for example in order to control antilock braking, slip control, or vehicle dynamics control systems. A defect in the activation of a solenoid valve 1 is detected by a monitoring logic system (not depicted) of the activation ICs or drivers 3. In this situation, appropriate activation of all the solenoid valves causes fuse 4 to respond, and thus interrupts power to all solenoid valves 1.

What is claimed is:

1. A safety device for a plurality of electrical loads, comprising:
   a supply line connected to the plurality of electrical loads;
   a plurality of drivers, each one of the plurality of drivers exclusively corresponding to one of the plurality of electrical loads and activating the one of the plurality of electrical loads; and
   a fuse provided in the supply line, wherein, if a defect occurs in at least one of at least one driver of the plurality of drivers and at least one electrical load of the plurality of electrical loads, at least two other drivers of the plurality of drivers is activated such that the fuse interrupts the supply line, the defect being detected by a monitoring logic system.

2. The safety device according to claim 1, wherein:
   the supply line includes a high-side path and a low-side path, each one of the plurality of electrical loads is connected between the high-side path and the low-side path, the plurality of drivers is provided on the low-side path, and the fuse is provided on the high-side path.

3. The safety device according to claim 1, wherein the fuse includes a blow-out fuse.

4. The safety device according to claim 1, wherein the plurality of electrical loads includes a plurality of solenoid valves for use in one of an antilock braking, a slip control, and a vehicle dynamics control system.

5. A method for shutting off a power supply to a plurality of electrical loads connected to a supply line and capable of being activated individually during a normal operation by an associated plurality of drivers provided in the supply line, comprising the step of:

if a defect occurs in at least one of at least one driver of the plurality of drivers and at least one electrical load of the plurality of electrical loads, activating at least two other drivers of the plurality of drivers such that a fuse provided in the supply line interrupts the supply line in order to disconnect all electrical loads of the plurality of electrical loads from a supply voltage applied to the supply line, wherein:

the defect is detected by a monitoring logic system, and each one of the plurality of drivers exclusively corresponds to one of the plurality of electrical loads and activates the one of the plurality of electrical loads.

6. The method according to claim 5, wherein:

the supply line includes a high-side path and a low-side path, each one of the plurality of electrical loads is connected between the high-side path and the low-side path, the plurality of drivers is provided on the low-side path, and the fuse is provided on the high-side path.

* * * * *